United States Patent [19]

Hubbard et al.

[11] 4,017,870

[45] Apr. 12, 1977

[54] TRUNCATED BALL PEN

[75] Inventors: James R. Hubbard, Moorestown; Charles A. Erdman, Marlton, both of N.J.

[73] Assignee: Graphic Controls Corporation, Cherry Hill, N.J.

[22] Filed: Feb. 26, 1976

[21] Appl. No.: 661,815

[52] U.S. Cl. .......................... 346/140 A; 401/145; 401/209

[51] Int. Cl.² ................... G01D 15/16; B43K 5/04; B43K 7/00

[58] Field of Search ............ 346/140 A, 142, 145; 401/209, 210

[56] References Cited

UNITED STATES PATENTS 1,980,508  11/1934  Tefft ............................. 401/145

2,484,298  10/1949  Krahulec ..................... 346/140 A

*Primary Examiner*—George H. Miller, Jr.
*Attorney, Agent, or Firm*—Miller & Prestia

[57] ABSTRACT

Truncated pen with ball point writing tip, designed to contain a large volume liquid ink supply within a short axial length body includes a short axial length, wide diameter pen barrel. A liquid ink reservoir, housed inside of the barrel, is separated from a pressure regulation mechanism by a thin diaphragm. The pressure regulation mechanism constantly applies pressure on the ink supply contained within the ink reservoir, so that ink will be supplied to the writing tip regardless of the position in which the pen is disposed or the volume of ink remaining in the reservoir.

10 Claims, 3 Drawing Figures

TRUNCATED BALL PEN

BACKGROUND

Standard ball pens are constructed with tubular ink reservoirs that have typical inside diameters of 0.080 inch to 0.085 inch. The physical properties of the ink coupled with the small tubing diameter prevent the ink from running out of the tube when the pen is disposed in an attitude with the pen tip above the open end of the tube.

One common problem of such pens is that they do not write on vertical surfaces or with the tip up, since the ink does not retain suitable contact with the writing tip. Many attempts have been made to provide a pen that will write on vertical surfaces or on a surface when the pen tip is above the open end of the pen. Two such developments provide a ball point pen with an internal gaseous charge that urges the ink against the ball. See U.S. Pat. No. 2,500,998 (Morris) and U.S. Pat. No. 2,560,811 (Morris). However, such pressurized pens often require special ink to prevent leakage around the ball.

U.S. Pat. No. 2,444,004 (Chesler) discloses a writing instrument wherein a mechanical pressure device exerts a constant pressure against a lengthwise portion of a flexible ink reservoir sac. The pressure device, however, does not exert a pressure on the entire cross sectional area of the reservoir sac, nor does it exert its pressure in the direction of the writing tip itself. Thus, a substantial quantity of ink, trapped in the reservoir sac above the pressure means may never flow into the writing tip assembly.

Today, many commercial recorder instruments require the utilization of a short axial length ball point pen attached to a recorder pen arm. To be commercially valuable, such pens must contain a large volume ink supply, or else the frequent refilling of the ink supply will cause both delay and interruption of instrument operation.

Further, such a short axial length ball point pen must be leak-proof both at the writing tip and at the opposite end thereof so that it may be shipped and utilized without fear of damage due to such leakage. Moreover, a short axial length ball point pen capable of writing on any surface regardless of the manner in which the pen body is disposed is of even greater commercial value. Such a pen is made even more competitive if it does not require the utilization of special ink to prevent leakage around the ball.

Thus, it is an object of this invention to provide an inexpensive, short axial length, wide diameter ball point pen, containing a large volume of conventional ink, that will be of great commercial use in the recorder instrument field.

Another object is to provide a short axial length ball point pen that is substantially leak-proof at both ends thereof.

A more specific object of the present invention is to provide a short axial length ball point pen that exhibits the characteristic of being able to write on any surface regardless of the positioning of the writing end and opposite pen end.

SUMMARY OF THE INVENTION

These and other objects, which will become apparent in the further course of the specification are met by the truncated ball pen of the present invention. Briefly, the pen includes a short axial length, wide diameter barrel having both a proximal end and a distal end. An ink reservoir, housed inside of the barrel, is injected with the desired amount of ink.

A writing tip assembly, containing a ball point writing tip, mates at one end thereof with the ink reservoir. The other end of the writing tip assembly extends through a bore located in the proximal end of the barrel to contact a writing surface.

Also housed within the barrel, a pressure regulation means consisting of either a helical coiled tension spring or a resilient foam pad, composed, for example, of polyurethane, is adapted to constantly apply pressure across virtually the entire cross-sectional area of the ink reservoir and in the direction of the writing tip assembly, so that the ink will be urged towards the writing tip assembly and then onto the writing surface. A rollable fluid impervious diaphragm separates the pressure means from the ink reservoir. An end cap is fixedly attached to the distal end of the barrel, preferably by the use of a suitable adhesive or ultrasonic seal, so as to anchor the diaphragm and position the pressure regulation means.

BRIEF DESCRIPTION OF THE DRAWINGS

For a better understanding of the present invention reference may be had to the accompanying drawings in which.

DETAILED DESCRIPTION OF THE DRAWINGS

Figure 1:
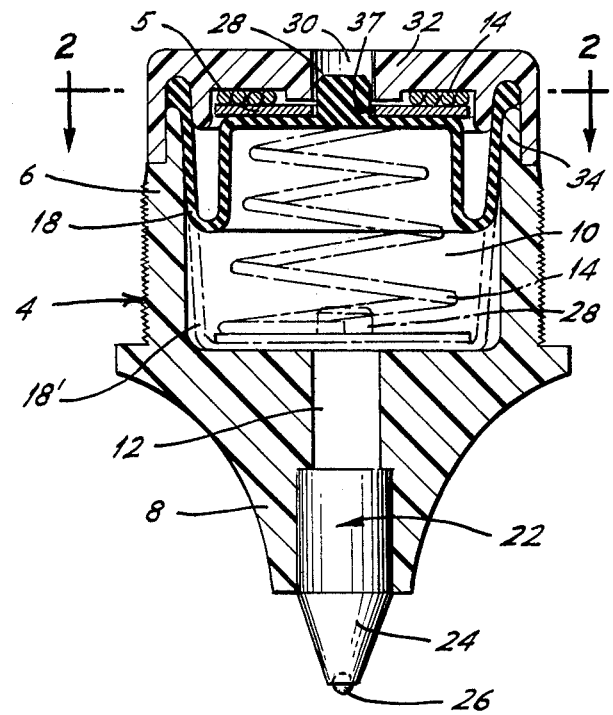
FIG. 1 is a view in cross-section, drawn partially in phantom, of one of the embodiments of the present invention.
Figure 2:
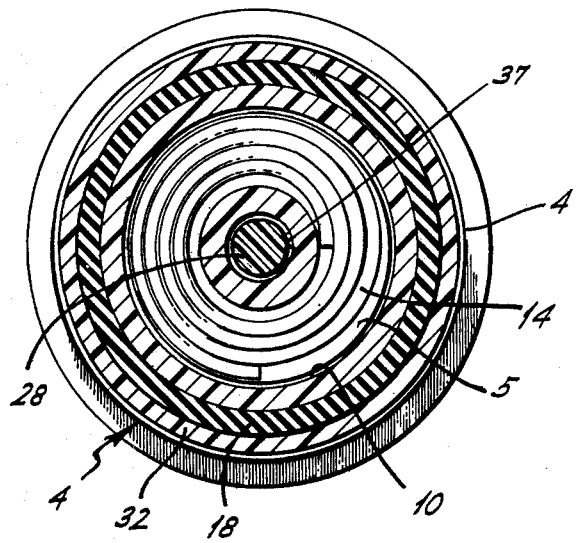
FIG. 2 is a view in cross-section of the pen shown in FIG. 1, taken in plane 2—2 of FIG. 1.

Referring now to the drawings, and particularly to FIGS. 1 and 2, there is shown a truncated pen of the present invention. Truncated pen 2 is comprised of a short axial length wide diameter barrel 4, molded or extruded from any lightweight plastic material. In this embodiment of the invention, barrel 4 is shaped to include both a wide diameter end 6 and a truncated generally conically shaped end 8 of smaller diameter than end 6. Threads 4' are provided on the outermost portion of barrel 4.

A liquid ink reservoir 10, housed inside of barrel 4, contains a large volume liquid ink supply. Ink from reservoir 10 is directly urged towards writing tip assembly 22 by pressure exerted by helical coiled tension spring 14 (also shown extended, in phantom) upon stabilizer plate 5. In turn, stabilizer plate 5 (also shown extended, in phantom) exerts pressure upon virtually the entire cross-sectional area of reservoir 10, through flexible diaphragm 18 (also shown extended, in phantom).

Stabilizer stud 28 (also shown extended, in phantom), attached to the center of diaphragm 18, extends through aperture 37 in plate 5 to prevent the lateral movement of plate 5 in relation to diaphragm 18 during the axial movement of diaphragm 18 as ink is used in writing. Spring 14 is positioned by the annular grooves formed towards the inside diameter of end cap 32. Vent 30 is formed in end cap 32 to allow the ambient atmosphere to enter the pocket formed by flexible diaphragm 18 and end cap 32.

Writing tip assembly 22 extends from ink reservoir 10 to and through the bore in truncated barrel end 8 to contact a writing surface. Flexible diaphragm 18 may be made from any rollable, fluid impervious material.

Ink is forced through writing tip conduit 12 to ball 26. Ball 26, rotatably mounted within an annular aperture formed in the apex of hollow conical tip 24, is thus supplied with sufficient ink so that it may mark the writing surface without the harmful application of heavy pressure to the surface.

End cap 32, made of any resilient plastic material, is fixedly secured over flanges 34 formed in wide diameter barrel end 6, preferably by use of either an ultrasonic seal or any suitable adhesive. Thus, end cap 32 also anchors rollable diaphragm 18 in place, and aids in properly positioning spring 14.

Figure 3:
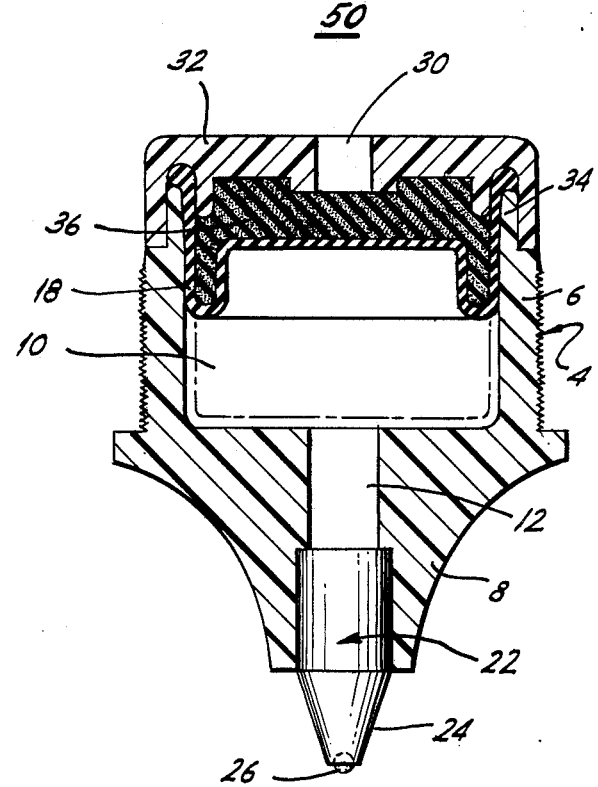
FIG. 3 is a view in cross-section, drawn partially in phantom, of another embodiment of the present invention.

FIG. 3 illustrates another embodiment of the present invention illustrating the interchangeability of different components of the present invention. In this drawing, pen 50 includes a different form of pressure regulation mechanism consisting of a resilient foam pad 36 comprised, for example, of polyurethane, that exerts pressure upon rollable diaphragm 18 (shown extended, in phantom).

As in the case of pen 2 illustrated in FIGS. 1 and 2, both ends of the truncated pen are leak-proof because of the fluid impervious nature of rollable diaphragm 18, and the tight fit of writing tip assembly 22 in the bore of truncated, conically shaped barrel end 8.

It will be apparent to those skilled in the art that the present invention is not limited to the particular constructions and arrangements shown and described but that changes and modifications may be made without departing from the spirit and scope of the invention. The appended claims should be so construed as to cover all such changes and modifications.

We claim the following:

1. A pen, designed to have a large internal volume contained within a short length body, comprising in combination:
   a. a short axial length wide diameter barrel, said barrel having a proximal end and a distal end;
   b. an ink reservoir housed inside of said barrel;
   c. a writing tip assembly, one end thereof extending from a bore in said proximal end of said barrel to contact a writing surface, the other end thereof mating with said ink reservoir inside of said barrel;
   d. pressure regulation means housed within said barrel adapted to exert a constant pressure across the entire cross-sectional area of said ink reservoir and in the direction of said writing tip assembly; and
   e. a rollable fluid impervious diaphragm inserted inside of said barrel adapted to separate said ink supply from said pressure means.

2. A pen, as recited in claim 1, wherein said proximal end of said barrel has a truncated conically shaped end of smaller diameter than said distal end.

3. A pen, as recited in claim 1, further including an end cap fixedly attached to said distal end of said barrel.

4. A pen, as recited in claim 2, wherein said pressure means consists of a resilient foam pad.

5. A pen, as recited in claim 4, further including a vent formed in said end cap.

6. A pen, as recited in claim 4, wherein said writing tip consists of a hollow conical tip attachment in combination with a ball, said ball being rotatably mounted within an aperture formed in the apex of said hollow conical tip attachment.

7. A pen, as recited in claim 3, wherein said pressure means consists of a helical coiled spring.

8. A pen, as recited in claim 7, wherein said writing tip consists of a hollow conical tip attachment in combination with a ball, said ball being rotatably mounted within an aperture formed in the apex of said hollow conical tip attachment.

9. A pen, as recited in claim 7, further including a vent formed in said end cap.

10. A pen, as recited in claim 9, further including a stabilizer stud and a stabilizer plate, said stabilizer plate having an aperture formed therein, said stud fixedly secured to said diaphragm and fitting through said aperture formed in said plate, said plate adapted to exert a continuous pressure upon said diaphragm, said stud adapted to prevent lateral movement of said plate during the axial movement of said diaphragm as ink is withdrawn from said pen.

* * * * *